United States Patent [19]
Ishizuka et al.

[11] 3,936,404
[45] Feb. 3, 1976

[54] AQUEOUS BAKING VARNISHES FROM CARBOXYLIC POLYESTER AND CARBOXYLIC POLYIMIDE, AND COATED ARTICLE

[75] Inventors: Takashi Ishizuka; Naoki Miwa, both of Osaka, Japan

[73] Assignee: Nitto Electric Industrial Co., Ltd., Osaka, Japan

[22] Filed: Aug. 19, 1974

[21] Appl. No.: 498,673

[30] Foreign Application Priority Data
Aug. 17, 1973 Japan.............................. 48-92831

[52] U.S. Cl......... 260/29.2 N; 204/181; 260/29.2 E; 260/78 TF; 260/841; 260/850; 260/857 PA; 260/857 PE; 428/423; 428/457; 428/474
[51] Int. Cl.$^2$..................... B32B 15/08; C08L 79/08
[58] Field of Search..... 260/29.2 N, 857 PA, 29.2 E

[56] References Cited
UNITED STATES PATENTS

| | | | |
|---|---|---|---|
| 3,223,666 | 12/1965 | Bolton............................ | 260/29.2 E |
| 3,528,937 | 2/1968 | Reynolds et al. .............. | 260/29.2 N |
| 3,573,132 | 3/1971 | Ducloux et al. ............... | 260/29.2 N |
| 3,634,304 | 1/1972 | Suzuki et al................... | 260/857 PA |

FOREIGN PATENTS OR APPLICATIONS

| | | | |
|---|---|---|---|
| 1,093,734 | 12/1967 | United Kingdom .......... | 260/857 PA |

*Primary Examiner*—Murray Tillman
*Assistant Examiner*—Arthur H. Koeckert
*Attorney, Agent, or Firm*—Sughrue, Rothwell, Mion, Zinn & Macpeak

[57] ABSTRACT

Aqueous baking varnishes having a low viscosity and a high concentration suitable for coating conductors which comprise
A. a carboxyl group containing polyester resin having an acid number of about 10 to 150 comprising the reaction product of
  1. an organic carboxylic acid component comprising
     a. about 15 to 100 mol% of at least one of an aromatic tricarboxylic acid and the anhydride thereof in which up to 30 mol% of the aromatic tricarboxylic acid and the anhydride thereof can be replaced by at least one of an aromatic tetracarboxylic acid and the anhydride thereof, and
     b. about 0 to 85 mol% of at least one of a dicarboxylic acid and the anhydride thereof, and
  2. an organic alcohol component comprising at least one organic polyhydric alcohol; and
B. a polyimide resin comprising the reaction product of butanetetracarboxylic acid and/or an imide-forming derivative thereof and at least one organic diamine, wherein both resins are dissolved in an aqueous solution with a volatile base selected from the group consisting of ammonia and a volatile organic amine to render the resins soluble.

15 Claims, No Drawings

AQUEOUS BAKING VARNISHES FROM CARBOXYLIC POLYESTER AND CARBOXYLIC POLYIMIDE, AND COATED ARTICLE

BACKGROUND OF THE INVENTION

1. Field of the Invention

The present invention relates to aqeuous baking varnishes suitable for coating conductors such as electric wires.

2. Description of the Prior Art

Hitherto, almost all baking varnishes and particularly wire enamels are the so-called solvent type varnishes wherein an organic solvent such as cresol, xylene or naphtha is used. These varnishes have the defects that the solvent and gases of decomposition disperse in the air in the production of insulated wires causing air pollution and the cost is high because the solvent should be completely incinerated by a combustion furnace. Further, the working environment in the production and the use of these organic solvent-type varnishes is very bad due to their bad smell and fire is always a danger because the solvents are inflammable. Recently, it is particularly desired to obtain wire enamels which do not have such defects creating a poor environment.

Although aqueous varnishes have been suggested as harmless wire enamels, they are not suitable since these aqueous baking varnishes do not have a low viscosity, a high concentration and a good film-forming property.

SUMMARY OF THE INVENTION

It is an object of the present invention to provide aqueous baking varnishes suitable for coating conductors such as electric wires.

The present invention provides aqueous baking varnishes having a low viscosity and a high concentration suitable for coating conductors.

As the result of studies for improving such prior defects, it has been found that aqueous baking varnishes which comprise (A) a carboxyl group containing polyester resin having an acid number of about 10 to 150 comprising the reaction product of
1. an organic carboxylic acid component comprising
   a. about 15 to 100 mol% of at least one of an aromatic tricarboxylic acid and the anhydride thereof in which up to 30 mol% of the aromatic tricarboxylic acid and the anhydride thereof can be replaced by at least one of an aromatic tetracarboxylic acid and the anhydride thereof, and
   b. about 0 to 85 mol% of at least one of a dicarboxylic acid and the anhydride thereof, and
2. an organic alcohol component comprising at least one organic polyhydric alcohol; and (B) a polyimide resin comprising the reaction product of butane tetracarboxylic acid and/or an imide-forming derivative thereof and at least one organic diamine in an aqueous solution with a volatile base selected from the group consisting of ammonia and a volatile organic amine to render the resins soluble have a low viscosity and a high concentration and exhibit excellent mechanical, thermal and electric properties when baked on conductors, and thus the present invention has been accomplished.

DETAILED DESCRIPTION OF THE INVENTION

The carboxyl group containing polyester resins can be produced by reacting
1. an organic carboxylic acid component comprising organic polycarboxylic acids (or anhydrides thereof) as described hereinbefore containing at least 15 mol%, i.e., 15 mol% to 100 mol%, preferably 50 mol% to 100 mol%, of aromatic tricarboxylic acids (or anhydrides thereof) with
2. an organic alcohol component comprising organic polyhydric alcohols as described hereinbefore in an alcohol-rich state.

In this case, a preferred ratio of OH/COOH ranges from about 1.0 to 3.0 and preferably 1.15 to 1.95. If the ratio is below 1.0, gelation occurs during the reaction before the molecular weight of the product is sufficiently increased. If the ratio is above 3.0, polymers having too low a molecular weight are only obtained and thus it is difficult to form tough films even if the finally resulting varnishes are baked. However, it should be understood that an additional excess amount of alcohols can be added if a vacuum treatment is carried out after the conclusion of the reaction.

The reaction is carried out at a temperature ranging from about 100° to 300°C and preferably 160° to 220°C for a few hours to distill off water, whereby the contents gradually become a viscous resin and the acid number thereof decreases to below about 150. The reaction is stopped when the acid number is in the range of about 10 to 150, preferably 20 to 100, to obtain a colorless transparent resin. Then the resulting resin is dissolved in water by adding volatile basic compounds such as an aqueous ammonia solution to produce a transparent aqueous solution of the carboxyl group containing polyester resin. If the organic carboxylic acid component does not contain at least 15 mol% of aromatic tricarboxylic acids (or anhydrides thereof), the resulting resin is a cloudy solution when water which contains the basic compounds is added or becomes water-insoluble.

The reason why the reaction must be stopped when the acid number is in the range of about 10 to 150 is as follows. If the acid number is below about 10, the finally resulting aqueous baking varnish becomes cloudy and mechanical properties of the baked coating films and the film appearance are sometimes deteriorated. If the acid number is above about 150, carboxyl groups remain in the baked coating films and the electrical and thermal properties of the baked coating films deteriorate.

Where the resulting water soluble carboxyl group containing polyester is baked alone, it is difficult to form coating films having sufficient film strength and good properties. This fact is clear from Table 2 given hereinafter wherein properties of coated electric wires are shown.

On the other hand, in order to produce the polyimide resins from butanetetracarboxylic acid (or imide-forming derivatives) and organic diamines, the processes described in Japanese Pat. Publication No. 14503/1972 and 19710/1972 can be utilized. In the processes described in the above patent publications, butanetetracarboxylic acid (or the imide-forming derivative thereof) and an organic diamine are reacted in an equimolar amount in water at a concentration of about 65 to 85% by weight at a temperature of about 60° to 100°C. Polyimide resins having a comparatively high degree of polymerization are water-solubilized. The concept in these processes could be considered to be similar to that in the present invention. However, in the present invention, the molar ratio of butanetetracarboxylic acid/diamine does not have to be equimolar and can range from about ½ to 2 since the resulting polyimide resin is mixed afterwards with a polyester resin containing carboxyl groups. Thus, in the present invention, polyamide resins wherein the molar ratio of butanetetracarboxylic acid/diamines ranges from about ½ to 2 can be used, and polyimide resins having rather a low molecular weight which per se do not form films can also be used.

The reaction of the butanetetracarboxylic acid (or the imide-forming derivative thereof) and organic diamines is carried out in water at a concentration of about 50 to 80% by weight while removing water at above about 80°C and preferably 100 to 130°C. In this reaction, it is advantageous that a water-soluble organic solvent having a boiling point higher than 100°C, generally in the range of from about 150°C to 350°C, is incorporated in the reaction mixture in an amount of about 20 to 50% by weight based on the water whereby the reaction can proceed in a homogeneous reaction system without precipitation of the imide resin formed. Such an organic solvent can include, for example, glycols such as ethylene glycol, propylene glycol, 1,3-propanediol, diethylene glycol, triethylene glycol, ethylene glycol monomethyl ether, ethylene glycol monobutyl ether, diethylene glycol monomethyl ether, diethylene glycol dimethyl ether, triethylene glycol monomethyl ether, dipropylene glycol and the like or dioxanes.

The reaction is stopped when the acid number of the resin is in the range of about 50 to 400 and preferably 100 to 250. Then basic compounds such as an aqueous ammonia solution and water are added thereto to dissolve the resin. Thus, an aqueous solution of a blackish brown transparent resin is produced. If the acid number of the resin is below about 50, the resin does not become water soluble and cloudiness results. If the acid number is above about 400, a large amount of unreacted components remains in the resin and tough coating films can not be formed on baking. Neither the above described carboxyl group containing polyester resin nor the polyimide resin produced from butanetetracarboxylic acid (or imide forming derivative thereof) and organic diamines can form coating films having sufficiently good strength and excellent properties when baked alone. Particularly in the latter case, when the polyimide is baked on electric wires, coating films are only obtained having such a poor plasticity that they peel off at self-diameter winding.

However, it has been found that the aqueous varnishes composed of a mixture of these resins undergo cross-linking reactions between the molecules at baking and form strong coating films having excellent properties.

It will be easily understood that many kinds of varnishes having different properties can be produced by changing the proportion of the carboxyl group containing polyester resin (hereinafter, for brevity "polyester resin") and the polyimide resin produced from butanetetracarboxylic acid (or imide-forming derivative thereof) and organic diamines (hereinafter, for brevity "polyimide resin").

In order to attain the objects of the present invention, the polyimide resin can be added in an amount of less than about 500 parts by weight based on 100 parts by weight of the polyester resin. However, it is preferable to add 150 to 5 parts by weight and more preferably 100 to 10 parts by weight of the polyimide resin based on 100 parts by weight of the polyester resin. If the polyimide resin is added in an amount of 150 parts by weight based on 100 parts by weight of the polyester resin, the resulting varnishes sometimes are cloudy, particularly where the terminal group of the polyimide resin is an amino group. However, if heat resistance is required in the varnishes, it may be added in the amount of up to 500 parts by weight. It is not preferable to use the polyimide resin in an amount of below 5 parts by weight, because there is the possibility that the heat resistance and mechanical properties of the resulting varnishes are remarkably deteriorated.

The baking coating films produced from the aqueous varnishes of the present invention are composed substantially of an esterimide resin which contains ester groups and imide groups in the molecule. However, it should be understood that amide groups are formed in the molecule when the molar ratio of butanetetracarboxylic acid/organic diamines is below 1. Formation of the amide groups can be carried out not only during the reaction of butanetetracarboxylic acid and organic diamines but also during the reaction between the terminal amino groups of the polyimide resin and carboxyl groups of the polyester resin on baking.

In the prior art solvent type varnishes, coating films having sufficiently good properties can not be obtained unless organic metal compounds (such as tetrabutyl titanate) are added as the crosslinking agent at baking. However, according to the present invention, baked coating films having sufficiently good properties can be obtained without using such crosslinking agents. However, if desired, water soluble organic metal compounds, for example, titanium chelate compounds, e.g., titanium lactate, ammonium titanium lactate and ammonium zirconium lactate, water soluble phenol resins e.g., WP-71 (a trademark for a complete aqueous solution of phenolformaldehyde resin manufactured by Gun-ei Kagaku K.K., Japan), water soluble amino resins e.g., Mo-70W (a trademark for an aqueous solution of an alkylated methylolmelamine resin manufactured by Fuji Kasei K.K., Japan), Po-70W (a trademark for an aqueous solution of an alkylated methylolguanamine resin manufactured by Fuji Kasei K.K., Japan), hexamethoxymethylated melamine, tris-(2-hydroxyethyl)-isocyanurate and triethanolamine in an amount of less than about 10%, generally about 0.1 to 5%, by weight based on the non-volatile content of the varnishes can be effectively used as water soluble crosslinking agents. Further, since the aqueous baking varnishes of the present invention are composed of an aqueous solution of two kinds of resin having a low molecular weight, the concentrations of the solution are as high as about 45 to 65% while the viscosity is as low as about 1 to 100 poises. Accordingly, they have excellent processing properties, for example, the number of applications to bare copper wires decreases.

Aromatic tricarboxylic acids which can be used in this invention include (i) trimellitic acid or the anhydride thereof, hemimellitic acid or the anhydride thereof or trimesic acid having the formula

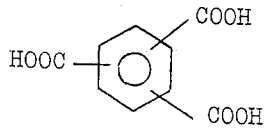

ii. 3,4,3'(or 3,4,4', etc.)-diphenyltricarboxylic acid having the formula

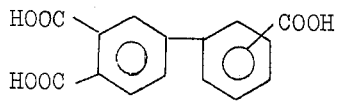

or the anhydride thereof, (iii) 3,4,3'(or 3,4,4', etc.)-tricarboxydiphenyl ether, 3,4,3'(or 3,4,4', etc.)-tricarboxydiphenylmethane, 3,4,3'(or 3,4,4', etc.)-tricarboxydiphenyl sulfide, 3,4,3'(or 3,4,4', etc.)-tricarboxydiphenyl sulfone, 3,4,3'(or 3,4,4', etc.)-tricarboxydiphenyl ketone, and 3,4,3'(or 3,4,4', etc.)-tricarboxydiphenylpropane having the formula

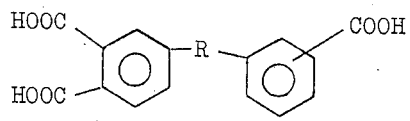

wherein R represents a methylene group, an oxygen atom, a sulfur atom, a -SO$_2$- group, a

group or a

group, or the anhydrides thereof or (iv) mixtures thereof.

In the present invention, a part, i.e., up to about 30 mol%, of the above described aromatic tricarboxylic acid or the anhydride thereof can be replaced by an aromatic tetracarboxylic acid or the anhydride thereof to prepare the water-soluble insulating varnish. Such an aromatic tetracarboxylic acid or the anhydride thereof includes i) pyromellitic acid or the anhydride thereof, 3,3',4,4,'-diphenyltetracarboxylic acid or the anhydride thereof, or the isomers thereof, (ii) those represented by the general formula

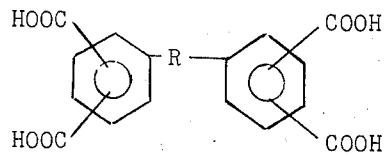

wherein R represents —O—, —CH$_2$—, —S—, —SO$_2$—, —CO— or

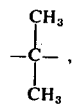

such as 3,3',4,4'-diphenylmethanetetracarboxylic acid or the anhydride thereof, 3,3',4,4'-diphenyl ether tetracarboxylic acid or the anhydride thereof, 3,3',4,4'-diphenylketonetetracarboxylic acid or the anhydride thereof, 3,3',4,4'-diphenylsulfonetetracarboxylic acid or the anhydride thereof, 3,3',4,4'-diphenylsulfidetetracarboxylic acid and the like; and iii) those represented by the formula

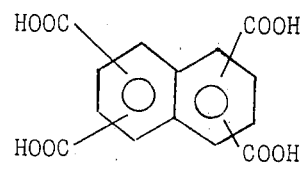

such as 1,2,5,6-naphthalenetetracarboxylic acid or the anhydride thereof, 1,4,5,8-naphthalenetetracarboxylic acid, 2,3,6,7-naphthalenetetracarboxylic acid and the like.

Organic dibasic carboxylic acids or the anhydrides thereof which can be used together with the aromatic tricarboxylic acids or the anhydrides thereof include succinic acid, succinic anhydride, malonic acid, adipic acid, sebacic acid, phthalic acid, phthalic anhydride, terephthalic acid, isophthalic acid, naphthalene - 1,4 (or 1,5,2,6, etc.)-dicarboxylic acid having the formula

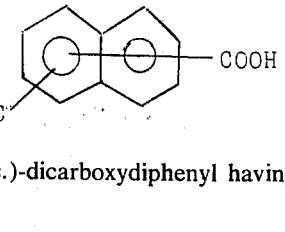

3,3' (or 4,4', etc.)-dicarboxydiphenyl having the formula

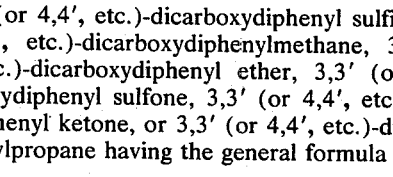

or 3,3' (or 4,4', etc.)-dicarboxydiphenyl sulfide, 3,3' (or 4,4', etc.)-dicarboxydiphenylmethane, 3,3' (or 4,4', etc.)-dicarboxydiphenyl ether, 3,3' (or 4,4')-dicarboxydiphenyl sulfone, 3,3' (or 4,4', etc.)-dicarboxydiphenyl ketone, or 3,3' (or 4,4', etc.)-dicarboxydiphenylpropane having the general formula

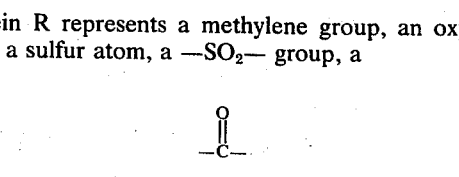

wherein R represents a methylene group, an oxygen atom, a sulfur atom, a —SO$_2$— group, a

group or a

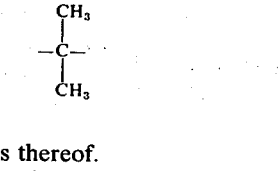

group, or mixtures thereof.

As the organic polyhydric alcohols, any of the aliphatic and aromatic alcohols can be used in the present invention. Examples of such alcohols include ethylene glycol, propylene glycol, 1,4-butanediol, 1,5-pentanediol, 1,6-hexanediol, 1,7-heptanediol, 1,8-octanediol, 1,9-nonanediol, 1,10-decandiol, diethylene gylcol, dipropylene glycol, triethylene glycol, glycerine, trimethylolpropane, tris(2-hydroxyethyl)isocyanurate, 1,2,6-hexanetriol, 3-methyl-1,3,5-hexanetriol, pentaerythritol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, 4,4'-dihydroxymethyl sulfide, 4,4'-dihydroxyethyldiphenyl sulfide and mixtures thereof. Further, bis-(2-hydroxyethyl) terephthalate, bis-(2-hydroxyethyl) isophthalate, bis-(3-hydroxypropyl) terephthalate and oligomers thereof can be used alone or as a mixture thereof or can be used together with the above described polyhydric alcohols.

The acid components for producing the polyimide resin used in the present invention include butanetetracarboxylic acid and imide-forming derivatives thereof such as butanetetracarboxylic acid monoanhydride, butanetetracarboxylic acid dianhydride, butane tetracarboxylic acid dimethyl ester, butanetetracarboxylic diethyl ester, butanetetracarboxylic dipropyl ester, butane tetracarboxylic dibutyl ester, butane tetracarboxylic diamide and butanetetracarboxylic diammonium salt which form imide groups by reacting with organic diamines.

Organic diamines which can be used in the present invention include any aliphatic and aromatic diamines and mixtures thereof, for example, those diamines having the following general formula $H_2H(CH_2)_nNH_2$, where $n$ is an integer not greater than 10,

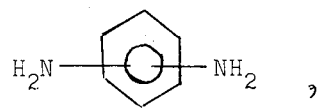

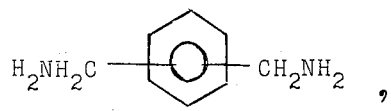

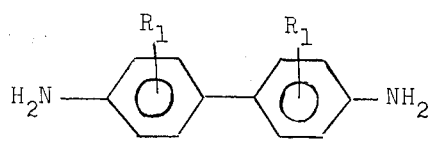

where $R_1$ represents a hydrogen atom, an alkoxy group, an alkyl group or a halogen atom,

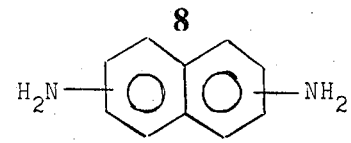

and

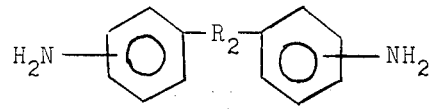

where $R_2$ represents a —CH$_2$—, —O—, —CH$_2$CH$_2$—, —CONH—,

—S— or

group.

Typical examples of these diamines are etylenediamine, hexamethylenediamine, heptamethylenediamine, octamethylenediamine, nonamethylenediamine, meta-xylylenediamine, para-xylylenediamine, meta-phenylenediamine, para-phenylenediamine, benzidine, 3,3'-dimethoxybenzidine, 3,3'-dichlorobenzidine, 3,3'-dimethylbenzidine, 1,5-diaminonaphthalene, 2,6-diaminonaphthalene, 4,4'-diaminodiphenylmethane, 4,4'-diaminodiphenyl ether, 3,4'-diaminodiphenyl ether, 4,4'-diaminodiphenylpropane, 4,4'-diaminodiphenyl sulfide, 4,4'-diaminodiphenyl sulfone, 3,3'-diaminodiphenyl sulfone, 3,4-diaminobenzanilide and the like. In addition to those described above, 2,4-bis($\beta$-amino-t-butyl)toluene, bis[p-($\beta$-amino-t-bytyl)phenyl] ether and the like can also be used as a diamine.

As compounds for changing the polyimide resin and the polyester resin into a water soluble resin, volatile basic compounds are preferably used in the present invention. Examples of such volatile basic compounds include an aqueous ammonia solution, ammonia, trialkylamines such as triethylamine, trimethylamine and tributylamine, N-alkyldiethanolamines such as N-methyl-diethanolamine, N-ethyldiethanolamine and N-propyldiethanolamine, N,N-dialkylethanolamines such as N,N-dimethylethanolamine, N,N-diethylethanolamine and N,N-dibutylethanolamine, monoethanolamine, diethanolamine, triethanolamine and mixtures of these compounds.

These compounds are added in an amount sufficient to render the resins water soluble. That is, they are added in an amount sufficient to neutralize the carboxyl groups present in the resin. However, water-solubilization does not necessarily require conversion of all of the carboxyl groups remaining in the resin into the salt form. Therefore, they only have to be added in an amount greater than that which enables the conversion of the resin into a water soluble resin, generally from about 0.3 to about 3 equivalents to the remaining carboxyl groups in the varnish. Volatile compounds such as ammonia or an aqueous ammonia solution can be added in an excess amount because the excess amount thereof can be removed by heating the varnishes at 100°C or so.

The aqueous varnishes obtained by the present invention are useful not only as baking varnishes, particularly wire enamels for coating conductors, but also for producing flexible printed-circuit plates, flat heating plates and tape cables by applying them to conductive foils and baking. A suitable baking temperature is generally greater than about 200°C, preferably 300° to 500°C. If desired, they can be used in transports such as vehicles, ships and aircraft, building materials such as aluminium window sashes and household, electric appliances such as refrigerators and washing machines. Further, the aqueous baking varnishes of the present invention can be used as top coatings or primer coatings. Furthermore, the aqueous baking varnishes of the present invention provide useful coating films by applying them to conductors using an electric method such as electrophoresis as disclosed in Japanese Pat. Publication No. 10541/1974, French Pat. No. 1,521,454 and British Pat. Specification Nos. 723,072 and 1,073,911 and baking. Further, a film-forming assistant (co-solvent) can also be employed in order to improve the flowability of the varnish at baking and the appearance of the resulting baked coating film. Such an assistant can be added in an amount ranging from about 5 to about 50% by weight based on the weight of the non-volatile components contained in the varnish. Examples of the film-forming assistances are ethylene glycol monomethyl ether, ethylene glycol monoethyl ether, ethylene glycol monoisopropyl ether, ethylene glycol monobutyl ether, ethylene glycol monoisobutyl ether, diethylene glycol monoethyl ether, diethylene glycol monoisopropyl ether, diethylene glycol monobutyl ether, diethylene glycol monoisobutyl ether, triethylene glycol monomethyl ether, triethylene glycol monoethyl ether, triethylene glycol monobutyl ether, ethylene glycol monomethyl ether acetate, ethylene glycol monoethyl ether acetate, ethylene glycol, propylene glycol, diethylene glycol, dipropylene glycol, triethylene glycol, glycerin, N,N-dimethylformamide, N,N-dimethylacetamide, N,N-diethylformamide, N-methyl-2-pyrrolidone, N,N-diethylacetamide, N,N-dimethylmethoxyacetamide, N-methylcaprolactam and the like.

In the following, the present invention will be further illustrated by reference examples. However, the present invention is not intended to be construed as being limited to these examples. Unless otherwise indicated, all parts, percents, ratios and the like are by weight.

REFERENCE EXAMPLE 1

(Production of an aqueous solution of a polyester resin) 960g (5 mols) of trimellitic acid anhydride, 415g (2.5 mols) of isophthalic acid, 620g (10.0 mols) of ethylene glycol and 322g (3.5 mols) of glycerin were charged in a 1 liter 4-neck flask equipped with a condenser, a thermometer, a dropping funnel and a stirrer, and the mixture was heated with stirring. Water began to distill at about 170°C. When the reaction was carried out at 180° to 220°C for 3 hours, 210cc of water was distilled and a colorless transparent resin having an acid number of 82 was obtained. The temperature was then reduced to 100°C and 200g of concentrated aqueous ammonia (concentration: above 28%) diluted with 1900g of water was added thereto. The resulting mixture was stirred at 100°C for 30 minutes to produce a colorless transparent aqueous resin solution. It was found that the non-volatile content of this varnish was 50.2% (105° ± 2°C, drying for 2 hours) and that the viscosity thereof was 18 poises (B-type viscosimeter, at 30°C).

REFERENCE EXAMPLE 2

(Production of an aqueous solution of a polyester resin) 770g (4.0 mols) of trimellitic acid anhydride, 332g (2.0 mols) of terephthalic acid, 332g (2.0 mols) of isophthalic acid, 620g (10.0 mols) of ethylene glycol and 322 g (3.5 mols) of glycerin were charged in a 5 liter 4-neck flask equipped with a condenser, a thermometer, a dropping funnel and a stirrer, and the mixture was heated with stirring. Water began to distill at about 200°C or so. When the reaction was carried out at 200°to 220°C for 7 hours, 240g of water was distilled and a colorless transparent viscous resin having an acid number of 62 was obtained. Then the temperature was reduced to 110°C, and 140g of concentrated aqueous ammonia (concentration: above 28%) diluted with 2 liters of water was added thereto. The mixture was stirred at 100°C for 30 minutes to produce an aqueous solution of a colorless transparent resin. The non-volatile content of this varnish was 49.8% (105° ± 2°C, for 2 hours) and the viscosity thereof was 21 poises (B-type viscosimeter, at 30°C).

REFERENCE EXAMPLE 3

(Production of an aqueous solution of a polyester resin) 290g (1.5 mols) of trimellitic acid anhydride, 415g (2.5 mols) of terephthalic acid, 830g (5.0 mols) if isophthalic acid, 620g (10.0 mols) of ethylene glycol and 322 g (3.5 mols) of glycerin were charged in a 5 liter 4-neck flask equipped with a condenser, a thermometer, a dropping funnel and a stirrer and the mixture was heated with stirring. Water began to distill at about 200°C or so. When thre reaction was distilled and a colorless transparent viscous resin having an acid number of 38 was obtained. Then the temperature was reduced to 110°C and 90g of concentrated aqueous ammonia (concentration: above 28%) diluted with 1900g of water was added thereto. The mixture was stirred at 100°C for 30 minutes to produce an aqueous solution of a colorless transparent resin. The non-volatile content of this varnish was 52.0% (105°±2°C, for 2 hours) and the viscosity thereof was 28 poises (B-type viscosimeter, at 30°C).

REFERENCE EXAMPLE 4

(Production of an aqueous solution of a polyester resin)

592g (2.0 mols) of 3,4,3'-benzophenontricarboxylic acid, 332g (2.0 mols) of isophthalic acid, 310g (5.0 mols) of ethylene glycol and 161g (1.75 mols) of glycerin were charged in a 3 liter four-necked flask equipped with a condenser, thermometer, dropping funnel and a stirrer, and the mixture was heated while stirring. Water began to distill at 170°C. After the mixture was reacted at 180 to 220°C for 3 hours, 100cc of water had distilled and a colorless transparent resin having an acid number of 91 was obtained. At this point, the temperature was reduced to 110°C, and 100g of concentrated aqueous ammonia (concentration: more than 28%) diluted with 900cc of water was added thereto followed by stirring at 100°C for 30 minutes to obtain an aqueous solution of a colorless transparent resin. It was found that the non-volatile content of the resulting varnish was 51.3% (105° ± 2° C, drying for 2 hours) and that the viscosity thereof was 16 poises (B-type viscosimeter, at 30°C).

REFERENCE EXAMPLE 5

(Production of an aqueous solution of a polyimide resin)

468g (2.0 mols) of 1,2,3,4-butanetetracarboxylic acid, 396g (2.0 mols) of 4,4'-diaminodiphenylmethane, 160g of triethylene glycol and 800g of water were charged in a 3 liter 4-neck flask equipped with a condenser, a thermometer, a dropping funnel and a stirrer, and the mixture was heated with stirring. When the reaction was carried out at 100° to 130°C for 7 hours while distilling water, 860g of water was distilled and the acid number of the resulting resin became 180. 140g of concentrated aqueous ammonia (concentration: above 28%) diluted with 460g of water was then added thereto and the resulting mixture was stirred at 100°C for 30 minutes to obtain an aqueous solution of a blackish brown transparent resin. The non-volatile content of this varnish was 59.2% (105° ± 2°C, for 2 hours) and the viscosity thereof was 10 poises (B-type viscosimeter, at 30°C).

REFERENCE EXAMPLE 6

(Production of an aqueous solution of a polyimide resin)

468g (2.0 mols) of 1,2,3,4-butanetetracarboxylic acid, 198g (1.0 mol) of 4,4'-diaminodiphenylmethane, 120g of triethylene glycol and 400g of water were charged in a 3 liter 4-neck flask equipped with a condenser, a thermometer, a dropping funnel and a stirrer, and the mixture was heated with stirring. When the reaction was carried out at 100 to 130°C for 5 hours while distilling water, 420g of water was distilled and the acid number of the resulting resin became 360. Then 220g of concentrated ammonia (concentration: above 28%) diluted with 280g of water was added thereto, and the mixture was stirred at 100°C for 30 minutes to obtain an aqueous solution of a blackish brown transparent resin. The non-volatile content of this varnish was 59.2% (105° ± 2°C, for 2 hours) and the viscosity thereof was 10 poises (B-type viscosimeter, at 30°C).

REFERENCE EXAMPLE 7

(Production of an aqueous solution of a polyimide resin)

280g (1.2 mols) of 1,2,3,4-butanetetracarboxylic acid, 396g (2.0 mols) of 4,4'-diaminodiphenylmethane, 120g of triethylene glycol and 400g of water were charged in a 3 liter 4-neck flask equipped with a condenser, a thermometer, a dropping funnel and a stirrer, and the mixture was heated with stirring. When the reaction was carried out at 100° to 130°C for 4 hours while distilling water, 440g of water was distilled and the acid number of the resulting resin became 88. 60g of concentrated aqueous ammonia (concentration: above 28%) diluted with 540g of water was then added thereto, and the mixture was stirred at 100°C for 30 minutes to obtain an aqueous solution of a blackish brown transparent resin. The non-volatile content of this varnish was 56.0% (105° ± 2°C, for 2 hours) and the viscosity thereof was 11 poises (B-type viscosimeter, at 30°C).

EXAMPLE 1

300g of the varnish produced in Reference Example 1 was charged in a polyethylene container and mixed with 130g of the varnish produced in Reference Example 4. The mixture was blended for 10 minutes using a mixer. The resulting aqueous baking varnish had a non-volatile content of 52.5% (105° ± 2°C, for 2 hours) and a viscosity of 11 poises (B-type viscosimeter, at 30°C).

EXAMPLES 2 TO 19

Aqueous baking varnises were produced in the same manner as described in Example 1 using the compositions shown in Table 1. The non-volatile content and the viscosity of the resulting aqueous baking varnishes are shown in Table 1.

Table 1

| Example | Proportion of Aqueous Solutions | | | | Ratio by Weight of Non-volatile Content | | Aqueous Baking Varnish | |
|---|---|---|---|---|---|---|---|---|
| | Aqueous Solution of Polyester Resin | | Aqueous Solution of Polyimide Resin | | Polyester Resin | Polyimide Resin | Non-volatile Content | Viscosity |
| | Reference Example No. | Weight (g) | Reference Example No. | Weight (g) | | | (%) | (poises) |
| 1 | 1 | 300 | 5 | 130 | 100 | 50 | 52.5 | 11 |
| 2 | 1 | 300 | 5 | 260 | 100 | 100 | 53.8 | 13 |
| 3 | 1 | 300 | 5 | 26 | 100 | 10 | 50.5 | 18 |
| 4 | 1 | 300 | 6 | 130 | 100 | 50 | 50.0 | 12 |
| 5 | 1 | 300 | 6 | 260 | 100 | 100 | 51.0 | 17 |
| 6 | 1 | 300 | 7 | 130 | 100 | 50 | 54.3 | 21 |
| 7 | 1 | 300 | 7 | 26 | 100 | 10 | 51.8 | 16 |
| 8 | 2 | 300 | 5 | 130 | 100 | 50 | 53.2 | 18 |
| 9 | 2 | 300 | 5 | 260 | 100 | 100 | 51.1 | 21 |
| 10 | 2 | 300 | 6 | 130 | 100 | 50 | 47.3 | 21 |
| 11 | 2 | 300 | 6 | 260 | 100 | 100 | 48.1 | 12 |
| 12 | 2 | 300 | 7 | 130 | 100 | 50 | 50.1 | 13 |
| 13 | 2 | 300 | 7 | 50 | 100 | 20 | 52.2 | 11 |
| 14 | 3 | 300 | 5 | 130 | 100 | 50 | 52.0 | 26 |
| 15 | 3 | 300 | 6 | 130 | 100 | 50 | 50.6 | 10 |
| 16 | 3 | 300 | 7 | 130 | 100 | 50 | 49.8 | 16 |

Table 1-continued

| Example | Proportion of Aqueous Solutions | | | | Ratio by Weight of Non-volatile Content | | Aqueous Baking Varnish | |
|---|---|---|---|---|---|---|---|---|
| | Aqueous Solution of Polyester Resin | | Aqueous Solution of Polyimide Resin | | Polyester Resin | Polyimide Resin | Non-volatile Content (%) | Viscosity (poises) |
| | Reference Example No. | Weight (g) | Reference Example No. | Weight (g) | | | | |
| 17 | 4 | 100 | 5 | 260 | 100 | 300 | 52.8 | 22 |
| 18 | 4 | 150 | 6 | 260 | 100 | 200 | 51.6 | 13 |
| 19 | 4 | 300 | 7 | 130 | 100 | 50 | 52.0 | 16 |

The aqueous baking varnishes obtained in Examples 1 to 19 were applied to annealed copper wires having a diameter of 1.0mm using dies and baked at 400°C and at a rate of 6.5 m/min using a vertical furnace having a height of 3 m. The properties of the resulting wires are shown in Table 2. The examinations were carried out according to the method described in JIS C 3210 (method of examination for polyester copper wires).

For the purposes of comparison, the properties of the polyester resins of Reference Examples 1 to 4 are also shown in Table 2. When the polyimide resins of Reference Examples 5 to 7 were applied to the copper wires in the same manner, numerous cracks were caused upon self diameter winding.

Table 2

| | Reference Example No. | | | |
|---|---|---|---|---|
| | 1 | 2 | 3 | 4 |
| Enameled Wire Diameter (mm) | 1.071 | 1.071 | 1.073 | 1.073 |
| Bare Wire Diameter (mm) | 0.995 | 0.995 | 0.995 | 0.995 |
| Film Thickness (mm) | 0.038 | 0.038 | 0.039 | 0.039 |
| Windability | | | | |
| (1) Self-diameter Windability (normal conditions) | poor | poor | poor | poor |
| (2) Self-diameter Windability (20% stretched) | poor | poor | poor | poor |
| (3) Windability (good diameter 200°C × 24 hrs.) | 7d | 6d | 7d | 7d |
| Abrasion Resistance (load, 600g) (cycle times) | 26 | 13 | 15 | 21 |
| Cut Through Temperature (2kg load, 2°C/min.) (°C) | 275 | 246 | 223 | 244 |
| Heat Shock Resistance 180°C × 2 hrs. (good diameter) | 7d | 7d | 7d | 7d |
| Breakdown Voltage (KV) | 12.3 | 13.1 | 10.7 | 11.6 |
| Chemical Resistance | | | | |
| (1) Pencil hardness at normal conditions | 4H | 4H | 4H | 4H |
| (2) Pencil hardness after dipping in 5% sodium hydroxide | HB | HB | B | HB |
| (3) Pencil hardness after dipping in sulfuric acid (specific gravity : 1.2) | 4H | 4H | 4H | 4H |

| Example No. | | | | | | | | | |
|---|---|---|---|---|---|---|---|---|---|
| 1 | 2 | 3 | 4 | 5 | 6 | 7 | 8 | 9 | |
| 1.071 | 1.080 | 1.073 | 1.083 | 1.071 | 1.072 | 1.080 | 1.081 | 1.083 | |
| 0.995 | 0.995 | 0.995 | 0.995 | 0.995 | 0.995 | 0.995 | 0.995 | 0.995 | |
| 0.038 | 0.040 | 0.039 | 0.041 | 0.038 | 0.038 | 0.040 | 0.040 | 0.041 | |
| good | good | good | good | good | good | good | good | good | |
| good | good | good | good | good | good | good | good | good | |
| 2d | 1d | 4d | 2d | 2d | 2d | 4d | 2d | 1d | |
| 52 | 48 | 43 | 46 | 40 | 35 | 48 | 40 | 53 | |
| 320 | 350 | 280 | 312 | 330 | 311 | 286 | 328 | 361 | |
| 1d | 1d | 3d | 2d | 2d | 1d | 2d | 1d | 1d | |
| 13.2 | 14.2 | 13.3 | 14.2 | 13.8 | 12.6 | 14.1 | 14.2 | 13.8 | |
| 5H | 5H | 5H | 5H | 5H | 5H | 5H | 5H | 5H | |
| 5H | 5H | 4H | 4H | 5H | 3H | 2H | 5H | 5H | |
| 5H | 5H | 5H | 5H | 5H | 5H | 5H | 5H | 5H | |

| 10 | 11 | 12 | 13 | 14 | 15 | 16 | 17 | 18 | 19 |
|---|---|---|---|---|---|---|---|---|---|
| 1.072 | 1.071 | 1.073 | 1.071 | 1.083 | 1.072 | 1.071 | 1.080 | 1.072 | 1.073 |
| 0.995 | 0.995 | 0.995 | 0.995 | 0.995 | 0.995 | 0.995 | 0.995 | 0.995 | 0.995 |
| 0.038 | 0.038 | 0.038 | 0.038 | 0.041 | 0.038 | 0.038 | 0.040 | 0.038 | 0.038 |
| good | good | good | good | good | good | good | good | good | good |
| good | good | good | good | good | good | good | good | good | good |
| 3d | 2d | 3d | 4d | 2d | 2d | 3d | 1d | 2d | 2d |
| 32 | 36 | 42 | 40 | 40 | 51 | 32 | 51 | 46 | 43 |
| 314 | 334 | 303 | 286 | 309 | 300 | 276 | 458 | 398 | 320 |
| 2d | 2d | 2d | 3d | 2d | 2d | 3d | 1d | 1d | 2d |
| 12.6 | 13.2 | 14.1 | 13.2 | 12.6 | 13.9 | 12.8 | 13.8 | 13.1 | 12.9 |

Table 2-continued

| | | | | | Reference Example No. | | | | |
|---|---|---|---|---|---|---|---|---|---|
| | | | | 1 | 2 | 3 | 4 | | |
| 5H | 5H | 5H | 5H | 5H | 5H | 5H | 5H | 5H | 5H |
| 5H | 5H | 3H | 3H | 5H | 4H | 2H | 5H | 5H | 4H |
| 5H | 5H | 5H | 5H | 5H | 5H | 5H | 5H | 5H | 5H |

EXAMPLE 20

An aqueous solution of a polyester resin was prepared in the same manner as described in Reference Example 1 but using 1480g (5.0 mols) of 3,4,3'-benzophenonetricarboxylic acid anhydride in place of the trimellitic acid anhydride. The resulting aqueous solution had a non-volatile content of 48.2% (105° ± 2°C, drying for 2 hours). A mixture of 300g of the aqueous solution thus obtained and 130g of the aqueous solution of the polyimide resin obtained in Reference Example 5 was applied onto a copper plate of width of 50 mm, a length of 120 mm and the thickness of 1.0 mm and baked at 250°C for 10 minutes to obtain a strong coating film having good adhesion to the copper plate.

EXAMPLE 21

An aqueous solution of a polyester resin was prepared in the same manner as described in Reference Example 2 but using 516g (2.0 mols) of 4,4'-dicarboxydiphenyl ether in place of the terephthalic acid. The resulting aqueous solution had a non-volatile content of 48.9% (105° ± 2°C, drying for 2 hours). A mixture of 300g of the aqueous solution thus obtained and 130g of the aqueous solution of the polyimide resin obtained in Reference Example 6 was applied onto a copper plate as described in Example 20 and baked under the same conditions as described in Example 20 to obtain a strong coating film having good adhesion to the copper plate.

EXAMPLE 22

An aqueous solution of a polyimide resin was prepared in the same manner as described in Reference Example 5 but using 216g (2.0 mols) of metaphenylenediamine in place of the 4,4'-diaminodiphenylmethane. The resulting aqueous solution had a non-volatile content of 59.0% (105° ± 2°C, drying for 2 hours). A mixture of 130g of the aqueous solution thus obtained and 300g of the aqueous solution of the polyester resin obtained in Reference Example 1 was applied onto a copper plate as described in Example 20 and baked under the same conditions as described in Example 20 to obtain a strong coating film having good adhesion to the copper plate.

EXAMPLE 23

An aqueous solution of a polyimide resin was prepared in the same manner as described in Reference Example 6 but using 227g (1.0 mol) of 3,4'-diaminobenzanilide in place of the 4,4'-diaminodiphenylmethane. The resulting aqueous solution had a non-volatile content of 59.2% (105° ± 2°C, drying for 2 hours). A mixture of 130g of the aqueous solution thus obtained and 300g of the aqueous solution of the polyester resin obtained in Reference Example 2 was applied onto a copper plate as described in Example 20 and baked under the same conditions as described in Example 20 to obtain a strong coating film having good adhesion to the copper plate.

As is clear from the above described results, the present invention provides aqueous baking varnishes which are suitable for producing insulated wires having excellent mechanical, thermal and electrical properties by baking the mixture of the two varnishes which individually do not have sufficiently good film properties. Further, since water is used in these varnishes as a medium, air pollution at baking is not caused, because solvents or harmful gasses are not dispersed at baking as in the solvent type varnishes which contain solvents such as cresol, xylene or naphtha, etc. Consequently, the working environment is very safe and there is no danger of fire. Furthermore, they are much cheaper than the prior art solvent-type varnishes, because water is used as a medium. Accordingly they have a very high industrial value.

While the invention has been described in detail and with reference to specific embodiments thereof, it will be apparent to one skilled in the art that various changes and modifications can be made therein without departing from the spirit and scope thereof.

What is claimed is:

1. An aqueous baking varnish having a low viscosity and a high concentration suitable for coating conductors which comprises
   A. a carboxyl group containing polyester resin having an acid number of about 10 to 150 comprising the reaction product of
      1. an organic carboxylic acid component comprising
         a. about 15 to 100 mol% of at least one of an aromatic tricarboxylic acid and the anhydride thereof in which up to 30 mol% of the aromatic tricarboxylic acid and the anhydride thereof can be replaced by at least one of an aromatic tetracarboxylic acid and the anhydride thereof, and
         b. about 0 to 85 mol% of at least one of a dicarboxylic acid and the anhydride thereof; and
      2. an organic alcohol component comprising at least one organic polyhydric alcohol, the molar ratio of the carboxyl group content in the organic acid component to the hydroxyl group content in the organic alcohol component ranging from about 1:1 to 1:3;
   B. a polyimide resin comprising the reaction product of 1,2,3,4-butanetetracarboxylic acid and/or an imide-forming derivative thereof, and at least one organic diamine said polyimide resin having an acid number of about 50 to 400, wherein said resins are dissolved in an aqueous solution with a volatile base selected from the group consisting of ammonia and a volatile organic amine to render the resins soluble.

2. The aqueous baking varnish of claim 1, wherein said aromatic tricarboxylic acid is trimellitic acid or the anhydride thereof, hemimellitic acid or the anhydride thereof or trimesic acid having the formula

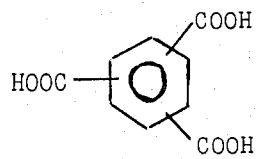

ii. a diphenyltricarboxylic acid having the formula

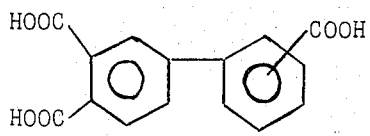

or the anhydride thereof, (iii). a tricarboxydiphenyl ether, a tricarboxydiphenylmethane, a tricarboxydiphenyl sulfide, a tricarboxydiphenyl sulfone, a tricarboxydiphenyl ketone or a tricarboxydiphenylpropane having the formula

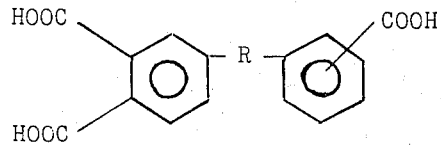

wherein R represents a methylene group, an oxygen atom, a sulfur atom, a —SO$_2$— group, a

group or a

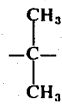

group or the anhydrides thereof or (iv) mixtures thereof,
wherein said dicarboxylic acid is (i) succinic acid; (ii) succinic anhydride; (iii) malonic acid (iv) adipic acid; (v) sebacic acid; (vi) phthalic acid; (vii) phthalic anhydride;
(viii) terephthalic acid; (ix) isophthalic acid; (x) a naphthalenedicarboxylic acid having the formula

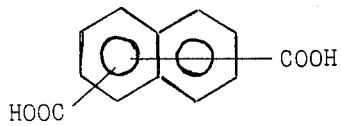

(xi) a dicarboxydiphenyl having the formula

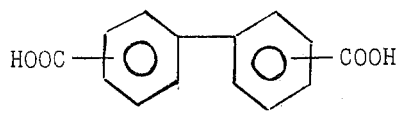

(xii) a dicarboxydiphenyl sulfide, a dicarboxydiphenylmethane, a dicarboxydiphenyl ether, a dicarboxydiphenyl sulfone, a dicarboxydiphenyl ketone or a dicarboxydiphenylpropane having the formula

wherein R represents a methylene group, an oxygen atom, a sulfur atom, a —SO$_2$— group, a

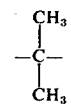

group or a

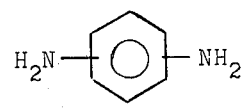

group; or (xiii) mixtures thereof;
wherein said organic polyhydric alcohol is ethylene glycol, propylene gylcol, 1,4-butanediol, 1,5-pentanediol, 1,6-hexanediol, 1,7-heptanediol, 1,8-octanediol, 1,9-nonanediol, 1,10 decanediol, diethylene glycol, dipropylene glycol, triethylene glycol, glycerin, trimethylolpropane, tris(2-hydroxyethyl) isocyanurate, 1,2,6-hexanetriol, 3-methyl-1,3,5-hexanetriol, pentaerythritol, 4,4'-dihydroxymethyldiphenyl, 4,4'-dihydroxyethyldiphenyl, 4,4'-dihydroxymethyldiphenylmethane, 4,4'-dihydroxyethyldiphenylmethane, 4,4'-dihydroxymethyldiphenyl ether, 4,4'-dihydroxyethyldiphenyl ether, 4,4'-dihydroxymethyldiphenyl sulfone, 4,4'-dihydroxyethyldiphenyl sulfone, 4,4'-dihydroxymethyldiphenyl ketone, 4,4'-dihydroxyethyldiphenyl ketone, 4,4'-dihydroxymethyldiphenylpropane, 4,4'-dihydroxyethyldiphenylpropane, 4,4'-dihydroxymethyl sulfide, 4,4'-dihydroxyethyldiphenyl sulfide, bis(2-hydroxyethyl) terephthalate, bis(2-hydroxyethyl)isophthalate, bis(3-hydroxypropyl)-terephthalate, the oligomers thereof or mixtures thereof; and
wherein said organic diamine is (i) H$_2$N(CH$_2$)$_n$NH$_2$ wherein $n$ is an integer not greater than 10, (ii)

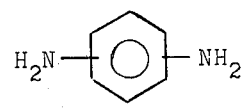

(iii)

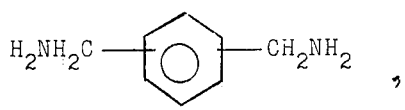

(iv)

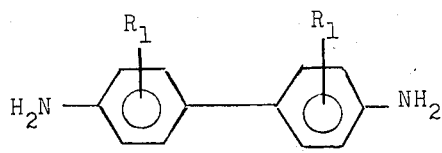

wherein $R_1$ represents a hydrogen atom, an alkoxy group, an alkyl group or a halogen atom, (v)

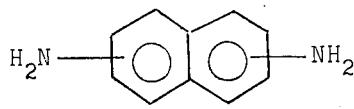

(vi)

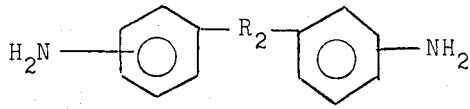

wherein $R_2$ represents —$CH_2$—, —O—, —$CH_2CH_2$—, —CONH—, $$-\underset{\underset{CH_3}{|}}{\overset{\overset{CH_3}{|}}{C}}-$$

—S— or —$SO_2$—; (vii) 2,4-bis($\beta$-amino-t-butyl)toluene; or (viii) bis [p-($\beta$-amino-t-butyl)phenyl] ether.

3. The aqueous baking varnish of claim 1, wherein said carboxyl group containing polyester resin has an acid number ranging from about 20 to 100.

4. The aqueous baking varnish of claim 1, wherein said polyimide resin is present in an amount of less than about 500 parts by weight per 100 parts by weight of said carboxyl group containing polyester.

5. The aqueous baking varnish of claim 4, wherein the molar ratio in said polyimide resin of said butanetetracarboxylic acid or an imide-forming derivative thereof to said organic diamine ranges from about 1:½ to 1:2.

6. The aqueous baking varnish of claim 1, wherein said volatile base is ammonia, a trialklamine, an N-alkyldithanolamine, an N,N-dialkylethanolamine, monoethanolamine, diethanolamine, triethanolamine or mixtures thereof.

7. The aqueous baking varnish of claim 1, wherein said butanetetracarboxylic acid or imide forming derivative thereof is butanetetracarboxylic acid, butanetetracarboxylic acid monoanhydride, butantetracarboxylic acid dianhydride, butanetetracarboxlic acid dimethyl ester, butanetetracarboxylic diethyl ester, butanetetracarboxylic diproply ester, butanetetracarboxylic dibutyl ester, butanetetracarboxylic diamide, butanetetracarboxylic diammonium salt, or mixtures thereof.

8. The aqueous baking varnish of claim 1, wherein said aromatic tricarboxylic acid or anhydride thereof is present in an amount of 50 to 100 mol%.

9. The aqueous baking varnish of claim 1, wherein the molar ratio of the carboxyl group content in the organic acid component to the hydroxyl group content in the organic alcohol component ranges from about 1:1 to 1:3.

10. The aqueous baking varnish of claim 1, wherein said varnish has a concentration ranging from about 45 to 65% by weight and a viscosity at 30°C measured with a B-type viscosimeter ranging from about 1 to 100 poises.

11. The aqueous baking varnish of claim 1, including a film-forming assistant.

12. The aqueous baking varnish of claim 1, wherein said varnish contains from 0.3 to 3 equivalents of said volatile base to the equivalents of free carboxyl groups in said varnish.

13. A wire enamel comprising the aqueous baking varnish of claim 1.

14. A coated article comprising an article having thereon a coated and baked layer of the aqueous baking varnish of claim 1.

15. The aqueous baking varnish of claim 1, wherein the molar ratio of OH/COOH ranges from 1.15 to 1.95.

* * * * *